(12) United States Patent
Pallot

(10) Patent No.: US 8,966,739 B2
(45) Date of Patent: Mar. 3, 2015

(54) WEIGHT ACTIVATED DEVICE

(76) Inventor: Rodney Philip Pallot, Winston Hills (AU)

( * ) Notice: Subject to any disclaimer, the term of this patent is extended or adjusted under 35 U.S.C. 154(b) by 280 days.

(21) Appl. No.: 13/577,611

(22) PCT Filed: Feb. 9, 2011

(86) PCT No.: PCT/AU2011/000134
§ 371 (c)(1),
(2), (4) Date: Aug. 7, 2012

(87) PCT Pub. No.: WO2011/097674
PCT Pub. Date: Aug. 18, 2011

(65) Prior Publication Data
US 2012/0308299 A1    Dec. 6, 2012

Related U.S. Application Data

(60) Provisional application No. 61/391,458, filed on Oct. 8, 2010.

(30) Foreign Application Priority Data

Feb. 11, 2010   (AU) ................................ 2010900544
Sep. 2, 2010    (AU) ................................ 2010903952

(51) Int. Cl.
| | |
|---|---|
| *B23P 11/00* | (2006.01) |
| *F16B 21/00* | (2006.01) |
| *A47C 7/00* | (2006.01) |
| *A47C 17/38* | (2006.01) |
| *F16M 7/00* | (2006.01) |

(52) U.S. Cl.
CPC ................ *A47C 7/002* (2013.01); *A47C 17/38* (2013.01); *F16M 7/00* (2013.01)
USPC ..................................... 29/525.03; 403/322.4

(58) Field of Classification Search
CPC ........ A47C 7/002; A47C 17/38; A47C 7/006; F16M 7/00; B23P 19/02; B64G 1/641; F16D 1/116
USPC ........... 29/404, 440, 466, 453, 525, 714, 718, 29/525.03, 525.02; 403/322.4, 325, 321
See application file for complete search history.

(56) References Cited

U.S. PATENT DOCUMENTS

| | | | |
|---|---|---|---|
| 3,917,203 | A | 11/1975 | Heubeck et al. |
| 6,120,094 | A | 9/2000 | Parent |
| 6,406,095 | B1 | 6/2002 | Bouchard et al. |
| 2005/0062322 | A1 | 3/2005 | Guillot et al. |

FOREIGN PATENT DOCUMENTS

| | | |
|---|---|---|
| JP | 04-208110 A | 7/1992 |
| WO | 93/11982 A1 | 6/1993 |
| WO | 2010/019672 A2 | 2/2010 |
| WO | 2010/102028 A1 | 9/2010 |

*Primary Examiner* — John C Hong
(74) *Attorney, Agent, or Firm* — David A. Guerra

(57) ABSTRACT

A device including: a load bearing structure for supporting a load on a surface; a surface engaging assembly operably connected to the load bearing structure; and, a biasing arrangement configured to be energized when the load is applied to the load bearing structure, the biasing arrangement urging the surface engaging assembly towards a disengaged condition to allow the movement of the device relative the surface.

20 Claims, 11 Drawing Sheets

WEIGHT ACTIVATED DEVICE

CROSS-REFERENCE TO RELATED APPLICATIONS

This application is an U.S. national phase application under 35 U.S.C. §371 based upon co-pending International Application No. PCT/AU2011/000134 filed on Feb. 9, 2011. Additionally, this U.S. national phase application claims the benefit of priority of co-pending International Application No. PCT/AU2011/000134 filed on February 9, Australia Application No. 2010900544 filed on Feb. 11, 2010, Australia Application No. 2010903952 filed on Sep. 2, 2010 and U.S. Application No. 61/391,458 filed on Oct. 8, 2010. The entire disclosures of the prior applications are incorporated herein by reference. The international application was published on Aug. 18, 2011 under Publication No. WO 2011/097674 A1.

BACKGROUND OF THE INVENTION

1. Field of the Invention

The invention generally relates a device for use in restricting the movement of a load bearing structure relative to a surface.

2. Description of the Prior Art

It is often desirable to secure a load bearing structure such as furniture to a surface such as the floor of a building, vehicle, trailer or boat. For example, furniture located in a vehicle may need to be secured to the floor as movement of the vehicle may cause the furniture to move relative the vehicle. This relative movement may damage the furniture, vehicle or be dangerous to occupants of the vehicle.

Furthermore, it is often desirable to be able move the load bearing structure relative the surface. For example, one may wish to reposition a piece of furniture such as a chair. To make the load bearing structure easy to move, wheels are often provided between the object and the surface. The wheels make the load bearing structure particularly prone to movement relative the surface.

Accordingly, there is a need to provide a load bearing structure which is able to be movable when required but is generally secured to the floor to restrict movement relative thereto.

SUMMARY OF THE INVENTION

In accordance with a broad aspect there is provided, a device including: a load bearing structure for supporting a load on a surface; a surface engaging assembly operably connected to the load bearing structure; and, a biasing arrangement configured to be energized when the load is applied to the load bearing structure, the biasing arrangement urging the surface engaging assembly towards an engaged condition whereby the movement of the device is restricted relative the surface.

In one form, the load applied to the load bearing structure is able to urge the surface engaging assembly into a disengaged condition whereby the load bearing structure is moveable relative the surface.

In one form, the surface engaging assembly adopts the engaged condition when the load applied to the load bearing structure is substantially removed.

In accordance with another broad aspect there is provided, a device including: a load bearing structure for bearing a load; a surface engaging assembly operably connected to the load bearing structure, wherein the surface engaging assembly is movable between: an engaged condition, wherein the load bearing structure bears substantially no load to restrict movement of the device relative to a surface, and a disengaged condition, wherein the load bearing structure bears the load to allow movement of the device relative to the surface; and a biasing assembly to bias the surface engaging assembly from the disengaged condition to the engaged condition.

In one form, the device includes a linkage mechanism which interconnects a first location on the load bearing structure with a second location on the load bearing structure, in use, the linkage mechanism effecting simultaneous movement between the first and second locations.

In one form, the device includes a lever operably connected to the linkage mechanism, the lever being operable so as to move the surface engaging assembly between the engaged condition and the disengaged condition.

In one form, the load bearing structure includes a base portion which houses the linkage mechanism, the base portion including the opposing sides wherein the first location is located on one of the opposing sides and the second location is located on the other of the opposing sides.

In one form, the linkage mechanism includes a linkage arm coupled to each of the opposed sides and a cross member which interconnects each of the linkage arms.

In one form, the surface engaging assembly is provided in the form of a coupling between the load bearing structure and the surface.

In one form, the coupling allows for limited lateral movement of the load bearing structure relative the surface when in the disengaged condition.

In one form, the coupling acts to tether the load bearing structure to the surface.

In one form, the coupling includes a pin projecting from one of the surface and the load bearing structure and a slot located on the other of the surface and the load bearing structure, the pin being at least partially received by the slot thereby coupling the load bearing structure to the surface.

In one form, in the disengaged condition, the pin is slidable within the slot, wherein the slot defines the limited lateral movement of the load bearing structure relative the surface.

In one form, the load bearing structure is supported by at least one friction reducing arrangement. In one form, the at least one friction reducing arrangement includes a wheel supported by a member which is in turn supported by the load bearing structure.

In one form, the biasing arrangement is configured to elevate the load bearing structure relative the surface by urging the at least one friction reducing arrangement to bear against the surface.

In one form, the biasing arrangement includes a spring.

In one form, the load bearing structure includes a base portion supporting a support portion.

In one form, the support portion is configured to provide a chair.

In one form, the surface is the floor surface of a vehicle.

In one form, the device includes a pivot mechanism configured to allow the load bearing structure rotate relative the surface about an axis substantially perpendicular to the surface.

In accordance with yet another broad aspect there is provided, a method of operating the abovementioned device, the method including the steps of: applying a load to the load bearing structure to disengage the surface engaging assembly; and substantially removing the load to allow the surface engaging assembly to return to the engaged condition.

In accordance with yet another broad aspect there is provided, a method of moving the abovementioned device between a first position and a second position, the method including the steps of: at the first position applying a load to the load bearing structure to disengage the surface engaging assembly; applying a lateral force to the load bearing structure thereby moving the device to the second position; removing the load from the load bearing structure so that the surface engaging assembly returns to the engaged condition in the second position.

In accordance with yet another broad aspect there is provided, a method of operating the abovementioned device, the method including the steps of: actuating the lever to disengage the surface engaging assembly; and releasing the lever to allow the surface engaging assembly to return to the engaged condition.

BRIEF DESCRIPTION OF THE DRAWINGS

The invention is described, by way of non-limiting example only, by reference to the accompanying drawings, in which.

DETAILED DESCRIPTION

Figure 1:
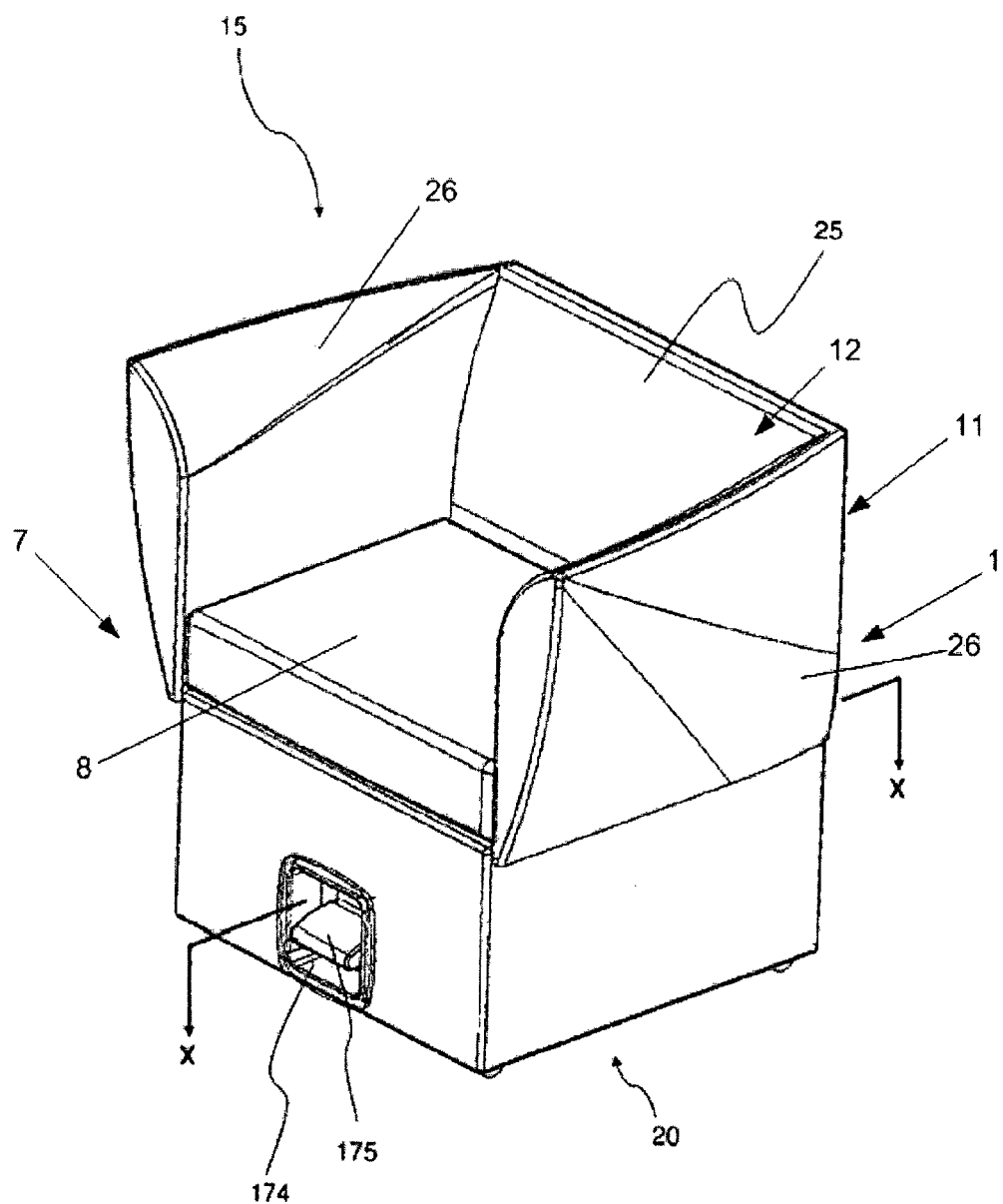
FIG. 1 is a perspective view of the load support structure with a base portion and a support portion. The support portion is illustrated in the form of a reconfigurable seat in a seating mode.

It should be noted in the following description that like or the same reference numerals in different examples denote the same or similar features.

Referring to FIGS. 1 to 5 there is illustrated a device 1 including a load bearing structure 7 for supporting a load (not shown) on a surface S. The device 1 further includes a surface engaging assembly 5 operably connected to the load bearing structure 7 and a biasing arrangement 16 configured to be energized when the load (not shown) is applied to the load bearing structure 7, the biasing arrangement 16 urging the surface engaging assembly 5 towards an engaged condition whereby the movement of the device 1 is restricted relative the surface S.

To disengage the surface engaging assembly 5, such that the load bearing structure 7 is moveable relative the surface S, the load is applied to the load bearing structure 7. The load is able to urge the surface engaging assembly 5 against the biasing arrangement 16 into the disengaged condition. When the load is removed the biasing arrangement 16 urges the surface engaging assembly 5 to the engaged condition.

The surface S in this example is envisaged to be a floor of a motor home or caravan. However, the floor may alternatively be any suitable support surface of a structure of a building, other type of vehicle or marine craft.

More particularly, the load bearing structure 7 is formed of a base portion 20 with opposing side walls 160, a front wall 170 and a back wall 172, these four walls being substantially vertical with respect to the substantially horizontal plane. The opposing side walls 160, front wall 170 and back wall 172 are interconnected by a base arrangement 100 which includes a generally horizontal plate 95 spanning between the opposing side walls 160.

The base portion 20 supports a support portion 11 which is configured to be mounted on a rectangular top rim 3 of the base portion 20, the top rim 3 being provided by the opposing side walls 160, front wall 170 and back wall 172. The support portion 11 includes a cushion arrangement 8, a side rest 26 and a backrest 25 configured to provide a seat portion 12. Although, the base portion 20 is illustrated as supporting the support portion 11, it should be appreciated that the base portion 20 may be used in absence of the support portion 11 or with other structures which achieve a similar purpose.

The load is envisaged to be a load above a threshold amount approximately in the range of 30 to 60 kilograms. Accordingly, a load above the threshold amount may arise by an adult applying weight by, for example, sitting on the seat portion 12 of the load bearing structure 7. However, other threshold amounts for the load may be also appropriate depending on specific configuration of the device 1 and/or intended use.

The surface engaging assembly 5 is provided in the form of a coupling 6 which couples the base portion 20 to the surface S. The coupling 6 including a pin 90 which extends between the surface S and a slotted groove 85 located in the horizontal plate 95, the pin 90 being receivable by the slotted groove 85. The plate 95, for example, may be a substantially circular plate comprising the slotted groove 85 disposed substantially across the diameter of the plate 95. The length slotted groove 85 is substantially defined by the size of the horizontal plate 95.

The pin 90 is rigidly affixed to the surface S and includes a neck portion 91 and a head portion 110. The neck portion 91 is configured to proceed through and be slidable relative to the slotted groove 85. The head portion 110 tapers outwardly from the neck portion 91 and is sized to be unable to proceed through the slotted groove 85 and as such the head portion 110 is captured on an opposing side of the slot 85 relative the surface S. Accordingly, the pin 90 and slotted groove 85 act as a tether between the surface and the base portion 20.

The pin 90 may be adapted, for example, partially threaded, riveted, or nailed, for insertion into one or more apertures 210 in the surface S such that each of the one or more respective pins 90 are fixedly attached to the floor where the longitudinal axis of each of the one or more respective pins 90 is in a substantially upright orientation.

It should be appreciated that the reverse situation may apply in which the slotted groove 85 is located in the surface S and base portion 20 includes a respective pin 90. In this form, the surface S would include the plate 95, such that each of the one or more respective pins 90 is adapted to engage with and slide in the corresponding slotted groove 85, accordingly resulting in the reversible movement of the load bearing structure 7 in the substantially horizontal plane relative to the fixed position of the slotted groove 85 in the surface.

The pin 90 is adapted for disengagement from the slotted groove 85 such that the load bearing structure 7 can be released from the pin 90 and removed for a particular reason, such as for example, maintenance or repair. For example, in this embodiment, a back wall 172 of the base portion 20 of each of the one or more load bearing structures 7 comprises a removable plug 103 that once removed from the back wall 172 exposes a void (not shown) in the base arrangement 100 such that when the slotted groove 85 and the void are substantially aligned, this alignment allows the slotted groove 85 to disengage from the respective pin 90, thereby enabling the load bearing structure 7 to be released from the respective pin 90 and removed.

The device 1 is supported by a friction reducing arrangement 18 provided in the form of four castor wheels 115 supported by leg support members or shafts 140. Each of the four castor wheels 115 is located beneath the base portion 20 and leg support shafts 140 are adapted to be received by a corresponding bracket 141 fixedly mounted in each corner of the base portion 20. Each support bracket 141 has a cylindrical housing 142 oriented in a substantially vertical direction to receive the leg support shaft 140, and an aperture 143 located at an upper surface 144 of the support bracket 141, the aperture 143 being substantially aligned with the cylindrical portion 142 of the support bracket 141 and adapted to receive a shaft portion 135 of the leg support shafts 140.

The circular housings 142 house the biasing arrangement 16 the biasing arrangement 16 including a spring 17. The spring 17 includes a first end which abuts an underside (not shown) of the top surface 144 of the support bracket 141 and a second end coupled to the leg support shafts 140 so as to bias the leg support shafts 140 and hence the castor wheels 115 to an extended position relative the base portion 20.

Figure 2:
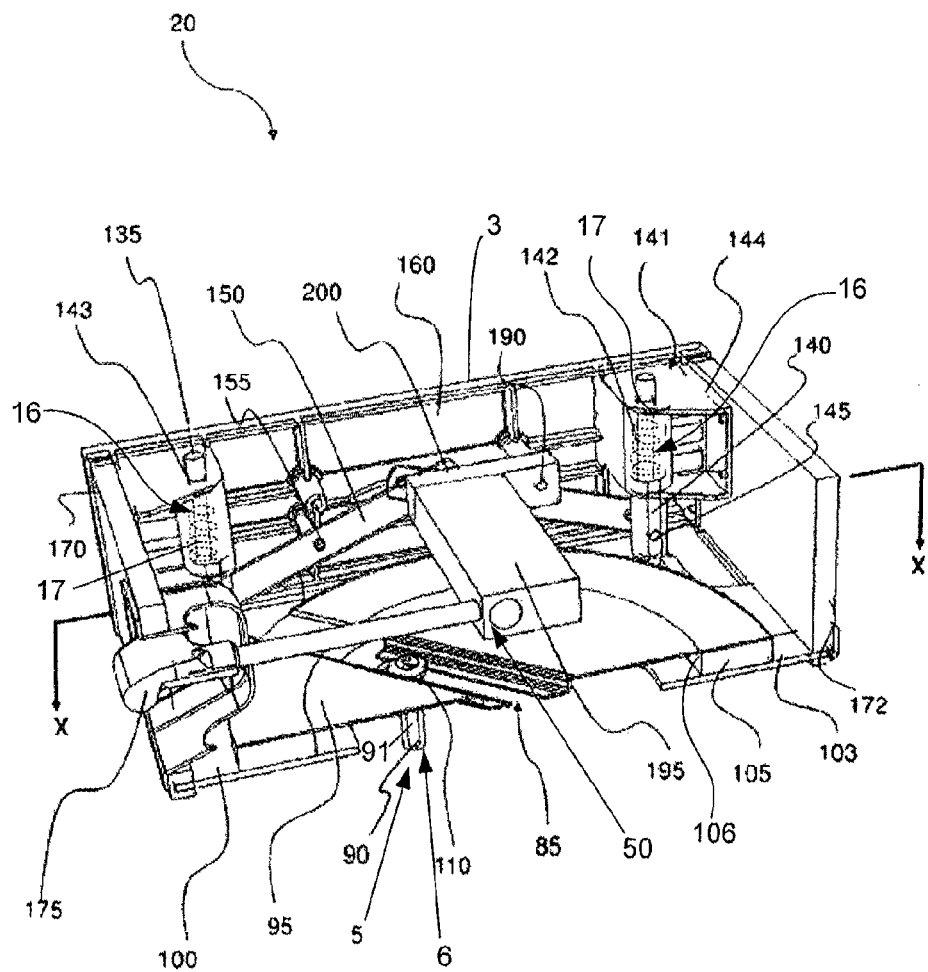
FIG. 2 is a perspective sectional view of the base portion of the load support structure of FIG. 1, taken along the line of symmetry X-X, comprising a surface engaging assembly in an engaged condition and a linkage mechanism.

Accordingly, the biasing arrangement 16 acts to bias the device 1 into a raised position relative the surface S. In the raised position, as is illustrated in FIG. 2, the base portion 20 and hence the slotted groove 85 is elevated relative the surface such that the slotted groove 85 bears against the underside of the head portion 110 of the pin 90 so as to provide the engaged condition. Accordingly, the biasing arrangement 16 urges the pin 90 and the slotted groove 85 into friction engagement thereby providing frictional locking between the surface S and the base portion 20 whereby the movement of the device 1 is restricted relative the surface S.

To disengage the pin 90 and slotted groove 85, the load is applied to the support portion 11 of the load bearing structure 7 such as a user sitting on the support portion 11. The base portion 20 is then accordingly urged towards the surface S which compresses the castor wheels 115 inwardly towards the base portion 20 and hence moves leg support shafts 140 towards the body 2. The movement of the leg support shaft 140 in turn compresses the biasing means arrangement 16. Accordingly, to achieve the disengaged condition it may be appreciated that the load must generally be sufficient to compress the biasing arrangement 16 enough to lower the slotted groove 85 such that the frictional engagement between the slotted groove 85 and the pin 90 is released.

Furthermore, it should be appreciated that when biasing arrangement 16 is compressed by the load, the biasing arrangement 16, in particular the spring 17, is energized. When energized the biasing arrangement 16 generally has increased potential energy relative to the potential energy of the biasing arrangement 16 when the surface engaging assembly 5 is in the engaged condition. Accordingly, a force associated with the potential energy urges the surface, engaging assembly 5 back towards the engaged condition.

In the disengaged condition, the base portion 20 is in a lowered position relative the surface S. As such, the head portion 110 of the pin 90 moves out of frictional engagement with the slotted groove 85, the neck 91 of the pin 90 is able to slide within the slotted groove 85. This allows movement of the load bearing structure 7 in the substantially horizontal plane whereby the slotted groove 85 moves relative the pin 90. In the disengaged condition, the device is then able to be wheeled, on the castor wheels 115, relative the surface S. Furthermore, as the slotted groove 85 is of a defined length there is defined range of limited lateral movement between the pin 90 and the slotted groove 85.

To return the surface engaging assembly 5 to the engaged condition, the load is removed and the springs 17 of the biasing arrangement 16 urge the leg support shafts 140 and hence the castor wheels 115 outwardly from the base portion 20. Accordingly, the base portion 20 is moved towards the raised position where slotted groove 85 bears against the underside of the head portion 110 of the pin 90 so as to provide the engaged condition.

Accordingly, it should be appreciated that the configuration of the biasing arrangement 16 and the surface engaging assembly 5, provide the device 1 with a releasable locking mechanism 120 which assumes an automatically locked condition in the absence of the load. In the automatically locked condition, the surface engaging assembly 5 in the engaged condition whereby the device 1 is restricted from movement relative the surface S.

Furthermore, if a lower or higher load threshold value is required, this may be implemented by, for example, replacing the springs 17 of the biasing arrangement 16 with springs having a spring compression force corresponding to the spring compression force required for achieving the desired load threshold value. The springs 17 may also be provided in the form of a pneumatic, hydraulic or electro-mechanical type arrangement.

Referring more specifically to FIGS. 2 to 5, the device 1 includes a linkage mechanism 50 which interconnects the leg support shafts 140 of the four castor wheels 115. The linkage mechanism 50 working to distribute a load applied to the load bearing structure 7 evenly across the four castor wheels 115.

In this respect, if a load is applied unevenly to the load bearing structure 7, for instance, the load is applied to a corner of the load bearing structure 7, the linkage mechanism 50 interconnecting the leg support shafts 140 of the four castor wheels 115 will ensure that the load is generally evenly distributed to all four of the castor wheels 115, via simultaneous actuation. This ensures that the underside of the base portion 20 moves evenly towards the four castor wheels 115 such that the slotted groove 85 disengages from the head portion 110 of the respective pin 90. Conversely, when the load is removed unevenly from the load bearing structure 7, for example, when a seated user vacates the support portion 11 such that their weight is applied more to a front part of the load bearing structure 7 rather than a back part of the load bearing structure 7, the linkage mechanism 50 ensures that the load is distributed evenly over the load bearing structure 7 to ensure that the base portion 20 moves away from the four castor wheels 115 in a uniform manner and the surface engaging assembly 5 assumes the engaged condition.

More particularly, the linkage mechanism 50 includes levelling arms 150 disposed adjacent each of the opposing side walls 160. The levelling arms 150 connect each of the four leg support shafts 140 of the four castor wheels 115 with a cross member 195 which substantially span between the opposing side walls 160.

Each levelling arm 150 includes a first end, a midpoint and a second end. The first end of each levelling arm 150 is pivotally attached at attachment point 145 on the appropriate leg support shaft 140 and the second end of each levelling arm 150 is pivotally attached at its second end to a respective end point (not shown) of the cross member 195. The mid-point of each levelling arm 150 is coupled to a medial pivot point 155 located in the side wall 160 of the base portion 20. In use, the levelling arm 150 is pivotable about the medial pivot point 155.

Each end of cross member 195 is pivotally attached to one of the two opposing side walls 160 at pivot point 190, such that the cross member 195 has pivotal rotation about pivot point 190 in a substantially vertical direction relative to the substantially horizontal plane of the base portion 20.

It may be appreciated that in this embodiment, the first ends and second ends of the two pairs of levelling arms 150 are pivotally attached to attachment points 145 and the end points of the cross member 195, respectively, through slots (hot shown) in the first ends and second ends of the two pairs of levelling arms 150, rather than, for example, circular apertures, the slots being adapted to slidingly receive and pivot about a bolt or pin (not shown) at attachment point 145 or at the respective end points of the cross member 195.

Accordingly, during transition of the locking mechanism 120 from the automatically locked condition where the surface engaging assembly 5 is in the engaged condition, to the unlocked condition where the surface engaging assembly 5 is in the disengaged condition, the respective bolts slide within the slots at the first and second ends of the two pairs of levelling arms 150 to allow for a change in height of the cross member 195 as it pivots in the substantially vertical direction relative to the substantially horizontal plane of the base portion 20.

Accordingly, it may be appreciated the linkage mechanism 50 interconnects a first location on the load bearing structure 7, such as one of the opposing sides 160 of the base portion 20 with a second location on the load bearing structure 7 such as the other of the opposing sides 160 of the base portion 20. The linkage mechanism 50 is able to then promote simultaneous movement between the first and second locations, when the load is applied to one of the first and second locations.

In this embodiment, it will be appreciated that for ease of manufacturing, each side wall 160 comprises two pivot points 190 and 191 (see FIGS. 3 and 4) such that only one side wall 160 needs to be manufactured, and this one side wall 160 can be used to form the two opposing side walls 160 of the base portion 20. Again, for ease of manufacturing, it will also be appreciated that the cross member 195 may comprise a pair of opposing and removably attachable adjoining members 200, as shown in FIGS. 2 to 5, the adjoining members 200 being located at either end of the cross member 195, and pivotally attached to one of the two opposing side walls 160 at pivot point 190. In this respect, only one adjoining member 200 needs to be manufactured, and this one adjoining member 200 can be removably attached to either end of the cross member 195 thereby reducing manufacturing cost and simplifying construction.

In this embodiment, the surface engaging assembly 5 may be moved to the disengaged condition by actuation a release arm 175. The release arm 175 is located in the base portion 20 and is coupled to the linkage mechanism 150.

The release arm 175 is reversibly moveable in a plane generally perpendicular to the substantially horizontal plane of the load bearing structure 7, between a locked position, where the surface engaging assembly 5 is in the engaged condition and a released position where the surface engaging assembly 5 is in the disengaged condition.

More particularly, the release arm 175 comprises a first end attached to the cross member 195, at a point located substantially in the middle of the cross member 195, and a second end terminating in a handle portion, the handle portion extending substantially through an access aperture 174 in the front wall 170 of the base portion 20. It will be appreciated that the access aperture 174 is of a suitable dimension to enable the release arm 175 and handle portion to be moved in a substantially vertical direction between the locked position and the released position.

Therefore, in this embodiment, when the surface engaging assembly 5 is in the engaged condition, the surface engaging assembly 5 is transitioned to the disengaged condition when the release arm 175 is manually depressed in a substantially downward direction which moves the underside of the base portion 20 against the bias of the biasing arrangement 16 towards the four castor wheels 115 to disengage the surface engaging assembly 5.

Therefore; when the load bearing structure 7 is locked in position relative to the respective pin 90 in the floor by the surface engaging assembly 5 being in the engaged condition, the load bearing structure 7 can be released by manually activating the release arm 175. This thereby causes lowering of the load bearing structure 7 such that the slotted groove 85 disengages from the respective pin 90 to enable reversible movement of the load bearing structure 7 along the slotted groove 85 without the need for a load to be applied to the load bearing structure 7.

Figure 3:
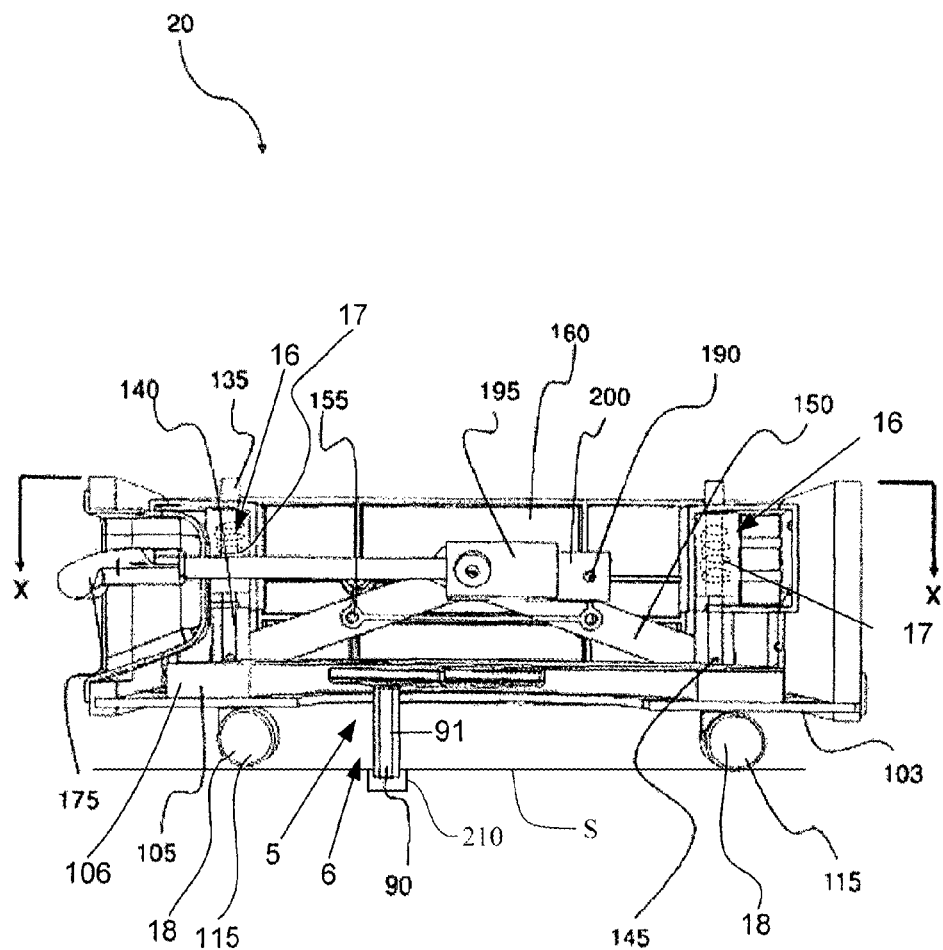
FIG. 3 is a side sectional view of the base portion illustrating the surface engaging assembly in the engaged condition and a linkage mechanism.
Figure 4:
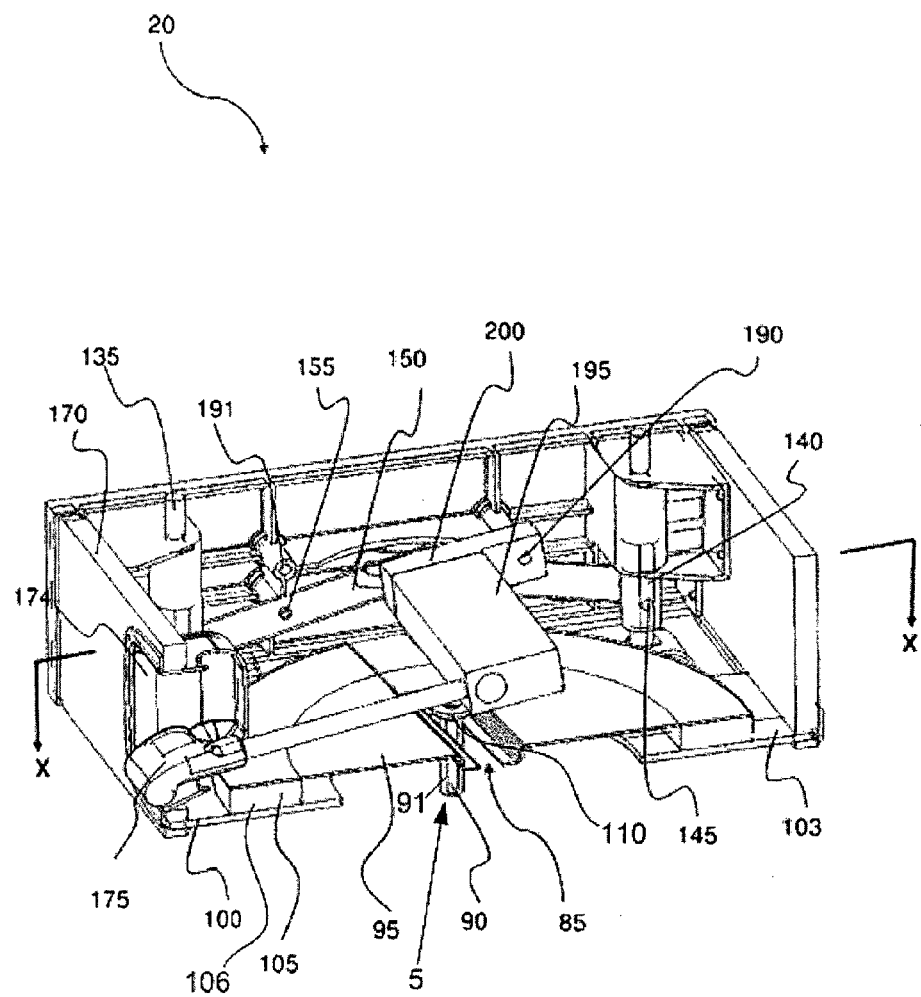
FIG. 4 is a perspective sectional view of the base portion illustrating the linkage mechanism and the surface engaging assembly in a disengaged condition.
Figure 5:
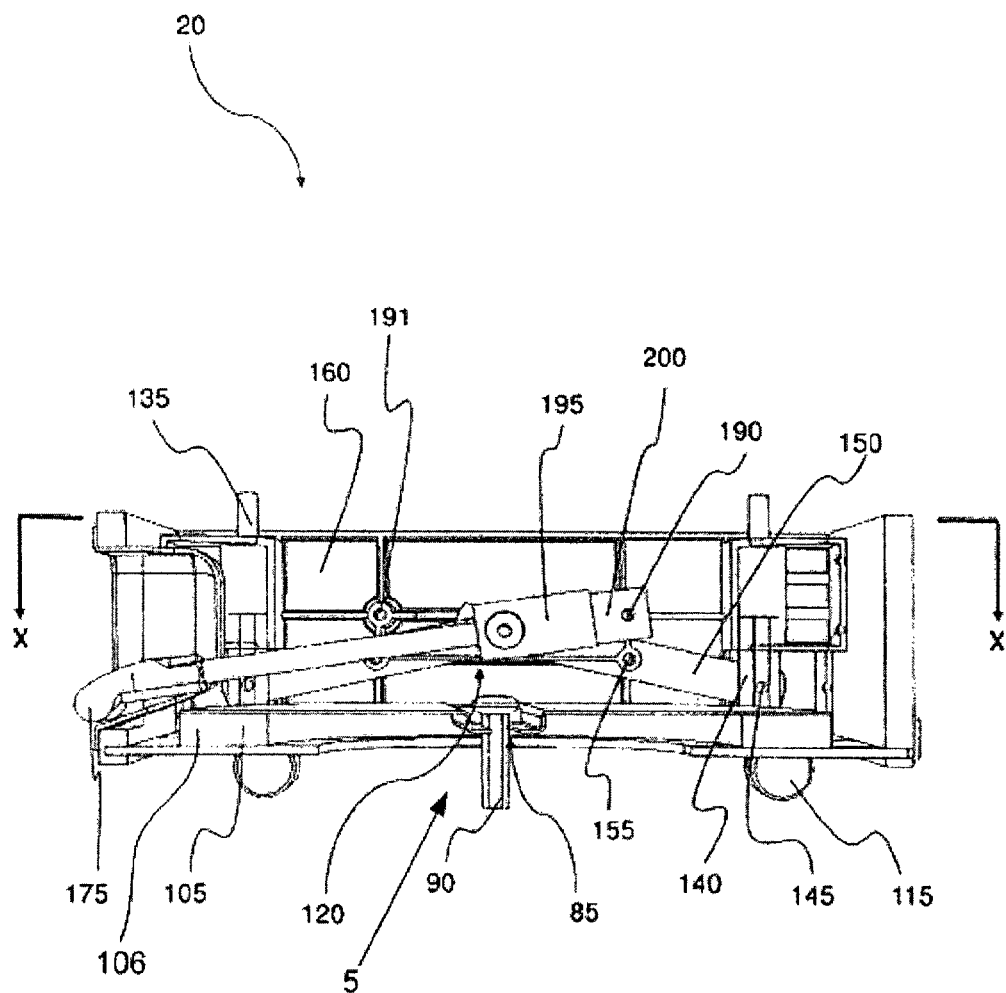
FIG. 5 is a side sectional view of the base portion of FIG. 4, illustrating the linkage mechanism and the surface engaging assembly in the disengaged condition.
Figure 10:
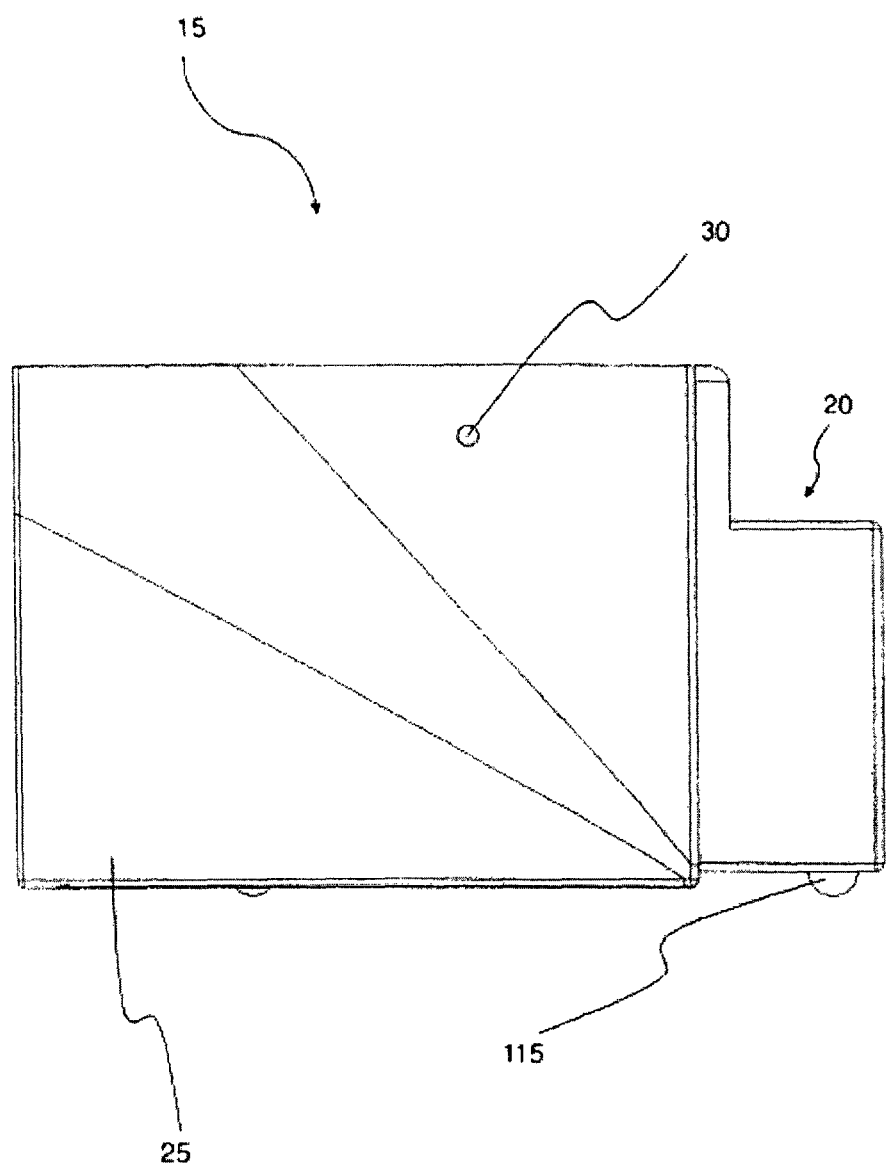
FIG. 10 is a side view of the configurable seat of FIG. 9 in the supporting mode.
Figure 11:
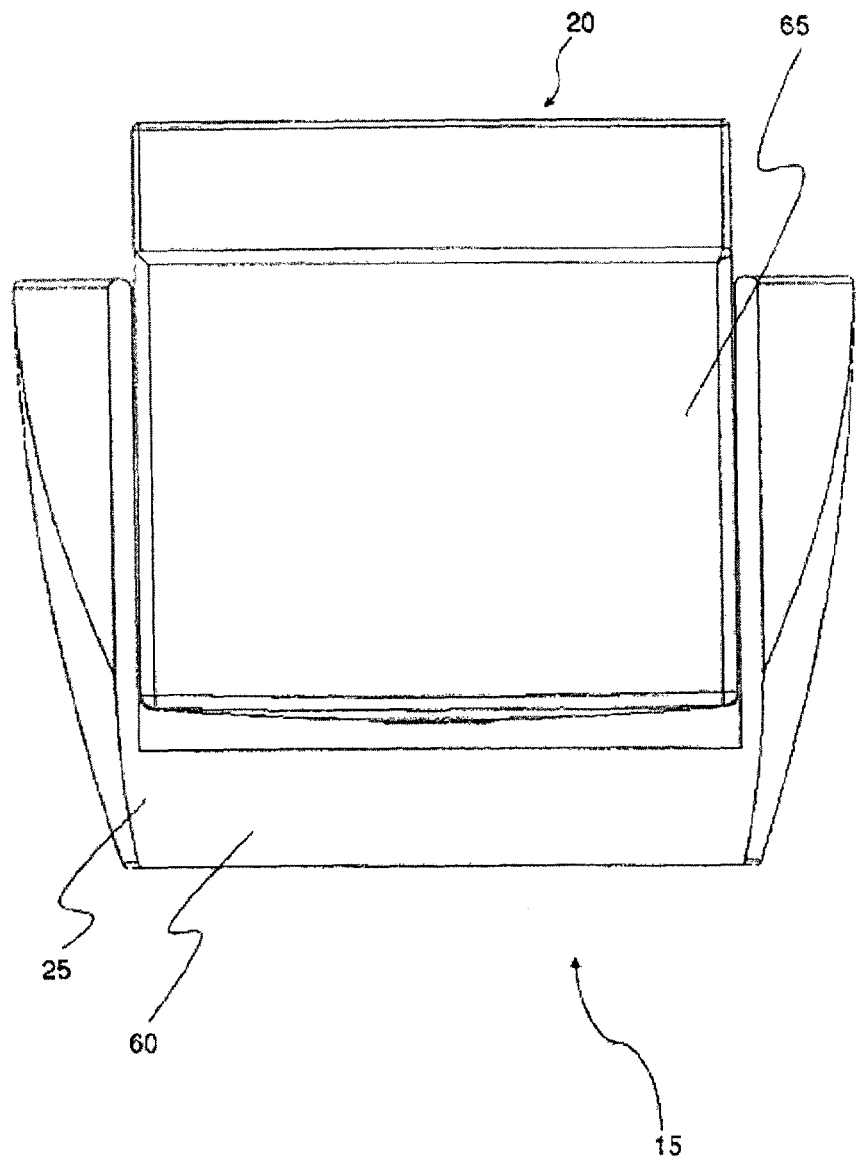
FIG. 11 is a top view of the configurable seat of FIGS. 9 and 10 in the supporting mode.

As shown in FIGS. 2 to 3, the release arm 175 is in the locked position when the release arm 175 is moved to an uppermost position, and as shown in FIGS. 10 to 11, the release arm 175 is in the released position when the release arm 175 is moved to a lowermost position relative to the substantially horizontal plane. For example, when the release arm 175 is manually depressed, the load bearing structure 7 is caused to lower such that the groove 85 of the load bearing structure 7 disengages from the respective pin 90 such that the surface engaging assembly 5 moves to the disengaged condition, thereby freeing the respective load, bearing structure 7 for reversible movement in the substantially horizontal plane.

Alternatively, releasing the release arm 175 causes the load bearing structure 7 to rise in a direction away from the surface S such that the slotted groove 85 engages with the respective pin 90, thereby switching from the released position in accordance with the disengaged condition of the surface engaging assembly 5 to the locked position in accordance with the engaged condition of the surface engaging assembly 5. The linkage mechanism 50 ensures that the movement of the leg support shafts 140 is synchronized with the movement of the release arm 175.

Similarly, when the release arm 175 is manually depressed to transition the surface engaging assembly 5 from the engaged condition to the disengaged condition, the manually applied force to the release arm 175 is distributed evenly across the four castor wheels 115 by the linkage mechanism 50 such that the load bearing structure 7 is lowered or raised uniformly.

In this respect, when the release arm 175 is manually depressed from the locked position to the released position, the release arm 175 applies a pivotal downward force on the cross member 195 causing the cross member 195 to pivot about pivot point 190 in a substantially downward direction relative to the substantially horizontal plane of the base portion 20.

The pivotal downward force on the cross member 195 is translated through the two respective end points either side of the cross member 195 to the two pairs of levelling arms 150, attached to the respective end points of the cross member 195 by their respective second ends in a generally downward direction causing the two pairs of levelling arms 150 to pivot about their respective medial pivot points 155 to force the four respective leg support shafts 140 into the cylindrical portions 142 of the respective support brackets 141, thereby lowering the load bearing structure 7 uniformly and subsequently drawing the underside of the support portion 11 towards the four castor wheels 115 such that the groove 85 disengages from the respective pin 90, placing the surface engaging assembly 5 in the disengaged condition.

It will be appreciated that in other embodiments, the reverse situation may apply such that the release arm 175 is in the locked position when the release arm 175 is moved to a lowermost position and in the released position when the release arm 175 is moved to an uppermost position relative to the substantially horizontal plane. In this regard, the corresponding components of the surface engaging assembly 5 will be suitably arranged to implement the engaging and disengaging of the load bearing structure 7.

In other embodiments, the load bearing structure 7 may not include the manual release arm 175.

As shown in FIGS. 2 to 5, rotational or pivotal motion load bearing structures 7 about a vertical axis perpendicular to the surface is achieved by utilizing a pivot mechanism 106. The pivot mechanism includes a circular bearing race 105 attached to the same plate 95 comprising the slotted groove 85 in the load bearing structure 7.

The circular bearing race 105 comprises an inner ring (not shown) and an outer ring (not shown), in between which are disposed a plurality of ball bearings (not shown) enabling the free rotation of one ring relative to the other. The inner ring may be fixedly attached to the plate 95 and the outer ring may be fixedly attached to the base arrangement 100, such that in use, the load bearing structure 7 can achieve rotational motion about their respective vertical axes by virtue of the inner ring and plate 95 the load bearing structure 7. Alternatively, the circular bearing race 105 may comprise an upper ring (not shown) and a lower ring (not shown), in between which the plurality of ball bearings are situated.

The plate 95 is fixedly attached to and suspended below a first circumference, for example, an inner ring (not shown), of the circular bearing race 105. Accordingly, a second circumference, for example, an outer ring (not shown), of the circular bearing race 105 may be fixedly attached to the base 100 of each of the one or more load, bearing structures 7. It will be appreciated that rotational motion of the load bearing structure 7 is not limited to the use of a circular bearing race 105, but that any suitable means of achieving rotational motion may be adopted in other embodiments.

It will be appreciated that the load bearing structure 7 may be adapted for reversible linear translation in the substantially horizontal plane but not adapted for rotational motion. For example, in this instance, the load bearing structure 7 may not comprise a circular bearing race 105 for rotational motion. Alternatively, the load bearing structure 7 may be adapted for rotational motion but not adapted for reversible linear translation in the substantially horizontal plane. For example, in this instance, the load bearing structure 7 may comprise a circular bearing race 105 for rotational motion but not comprise a groove 85 for engaging the respective pins 90 fixedly mounted to the floor, thereby preventing linear translation of the load bearing structure 7 in the substantially horizontal plane.

Furthermore, it is envisaged that the pivot mechanism 106 may includes a further brake system (not shown) for preventing the rotational motion the load bearing structure 7 about the circular bearing race 105. It is envisaged that this further brake system (not shown) would be operably coupled to the locking mechanism 120 such that when the locking mechanism adopted the automatically locked condition the brake system (not shown) is also activated to restrict the rotation of the load bearing structure 7 about the circular bearing race 105. When the locking mechanism 120 is moved to an unlocked condition where the surface engaging assembly is moved to the disengaged condition, the brake system will also become deactivated to allow the rotation of the load bearing structure 7 about the circular bearing race 105.

In one form, the brake system (not shown) is envisaged to include a tooth (not shown) protruding from the plate 95 which engages with a corresponding slot (not shown) on the base 100. The tooth (not shown) being movable between an engaged position wherein the tooth (not shown) is engaged with the slot (not shown) whereby the brake system (not shown) is activated, and a disengaged condition wherein the tooth (not shown) is disengaged from the slot (not shown) whereby the brake system (not shown) is deactivated.

In another aspect, the load bearing structure 7 may be utilized with a fold-away arrangement 10 shown in FIGS. 6 to 9.

The fold-away bed arrangement 10 comprises one or more of the load bearing structures 7 with a seat portion 12 located on top of the base portion 20. In this configuration, it may be appreciated that a movable or reconfigurable seat 15 is provided. In this embodiment, the backrest portion 25 is pivotally mounted to the seat portion 12 by a pivot element 30.

Accordingly, the backrest portion 25 is able to pivot between a seating mode, in which the backrest portion 25 is in a substantially upright orientation relative to the seat portion 12, and a supporting mode, in which the backrest portion 25 is in a forwardly rotated orientation.

The fold-away bed arrangement further includes a bed 45, configured for pivotal movement between a substantially stowed upright position and a substantially horizontal position, in which the bed 45 is supported on each seat portion 12 of the one or more configurable seats 15 in the supporting mode.

Furthermore, as the load bearing structures 7 are movable when the respective surface engaging assembly 5 is in the disengaged condition, the load bearing structures 7 may be moved horizontally relative the surface. Accordingly, the load bearing structures 7 may be positioned to provide a support for the bed 45 in the supporting mode.

Figure 9:
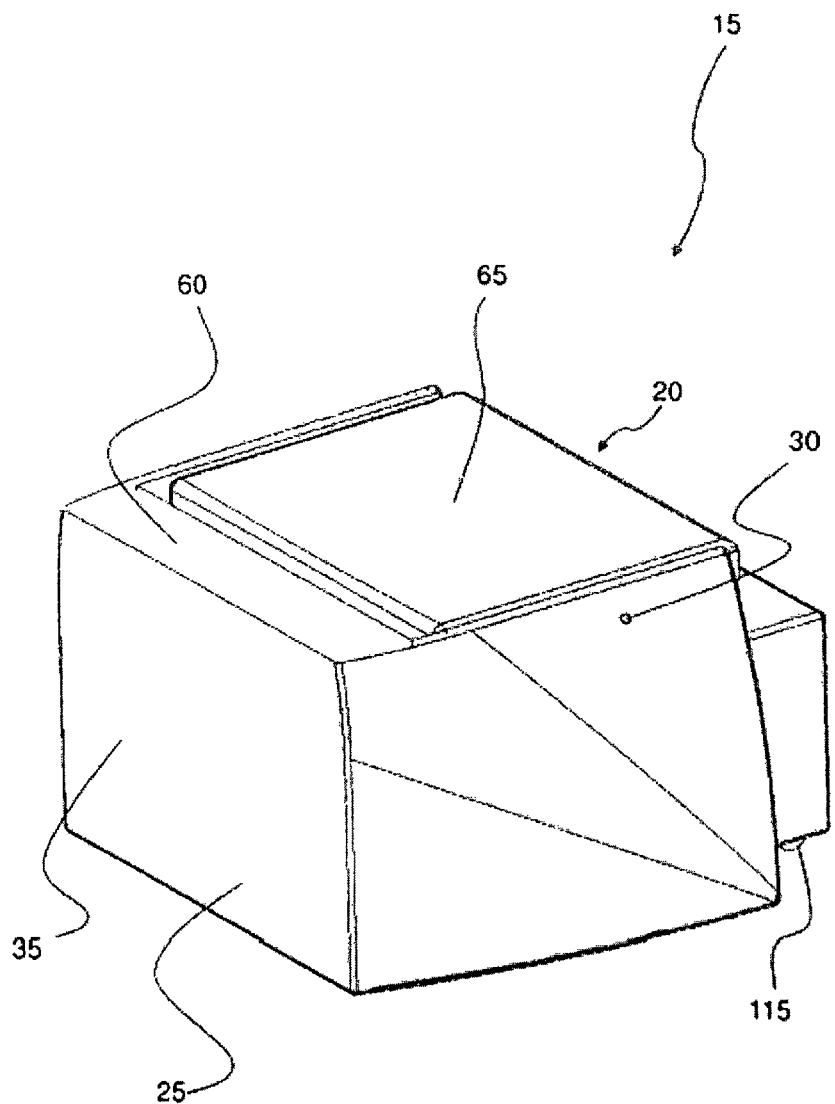
FIG. 9 is a perspective view of one of the one or more configurable seats in the supporting mode showing a backrest portion of the configurable seat in a forwardly rotated orientation.

Referring specifically to FIGS. 9 to 11 in this embodiment, when the one or more configurable seats 15 are in the seating mode, the backrest portion 25 of each of the one or more configurable seats 15 is in the substantially upright orientation and supported on a top surface 65 of each seat portion 12. It will be appreciated that each backrest portion 25 may be releasably locked to the respective seat portion 12 using any suitable locking means (not shown) when in the seating mode. For example, the releasable locking means may include, but is not limited to, any one of the following arrangements: a latch and hook, a clip and hook.

In the supporting mode, each backrest portion 25 is forwardly rotated by the pivot element 30 such that the backrest portion 25 in the supporting mode is in substantially inverted orientation with respect to the backrest portion 25 in the seating mode. For example, in this embodiment, when each backrest portion 25 is forwardly rotated by the pivot element 30 and substantially inverted, a back surface 35 of the backrest portion 25 locates in front of each respective seat portion 12, as shown in FIGS. 9 to 11.

Figure 6:
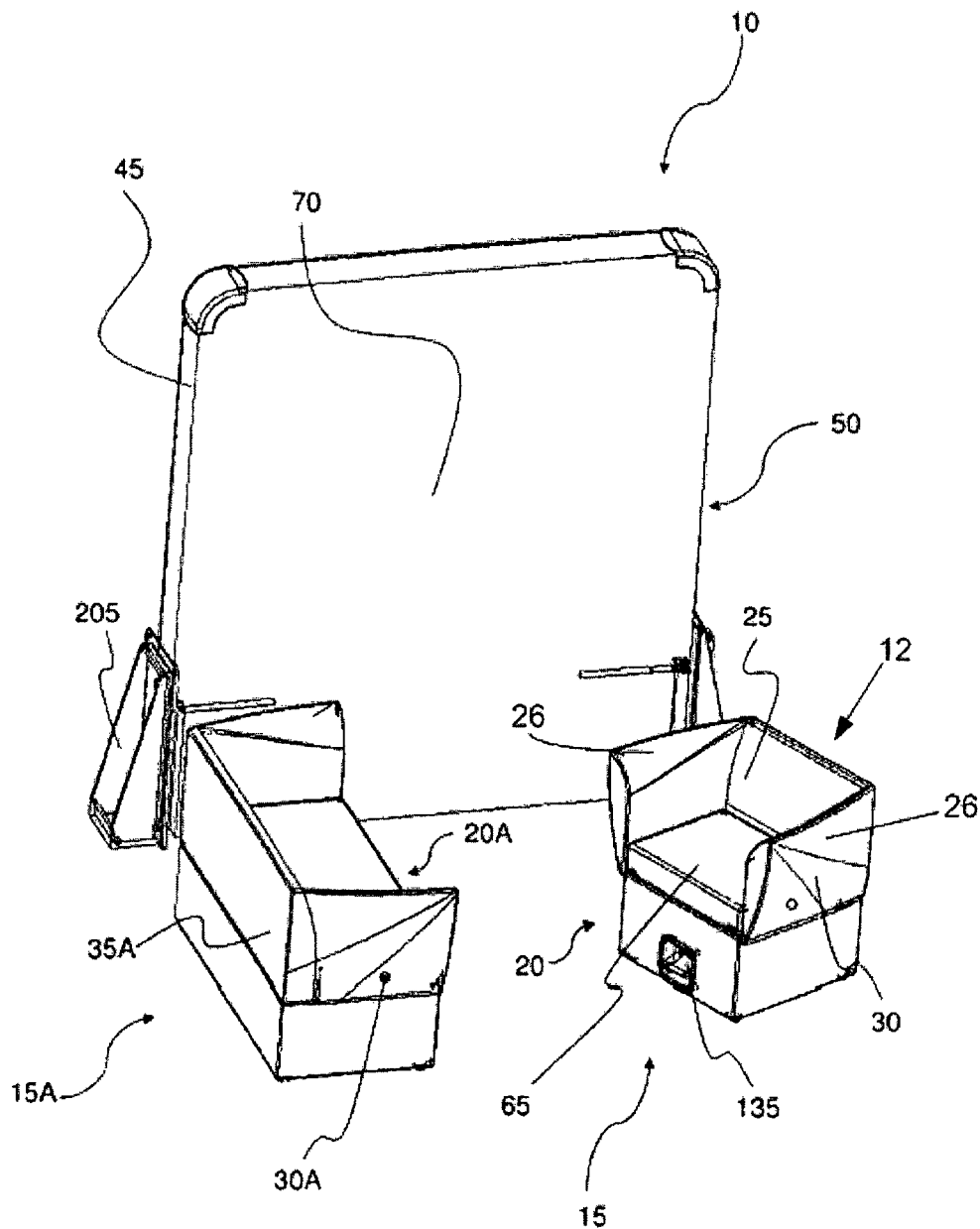
FIG. 6 is a perspective view of a fold-away bed arrangement comprising a bed in a substantially stowed upright position and one or more load bearing structures provided in the form of configurable seats in a seating mode.
Figure 7:
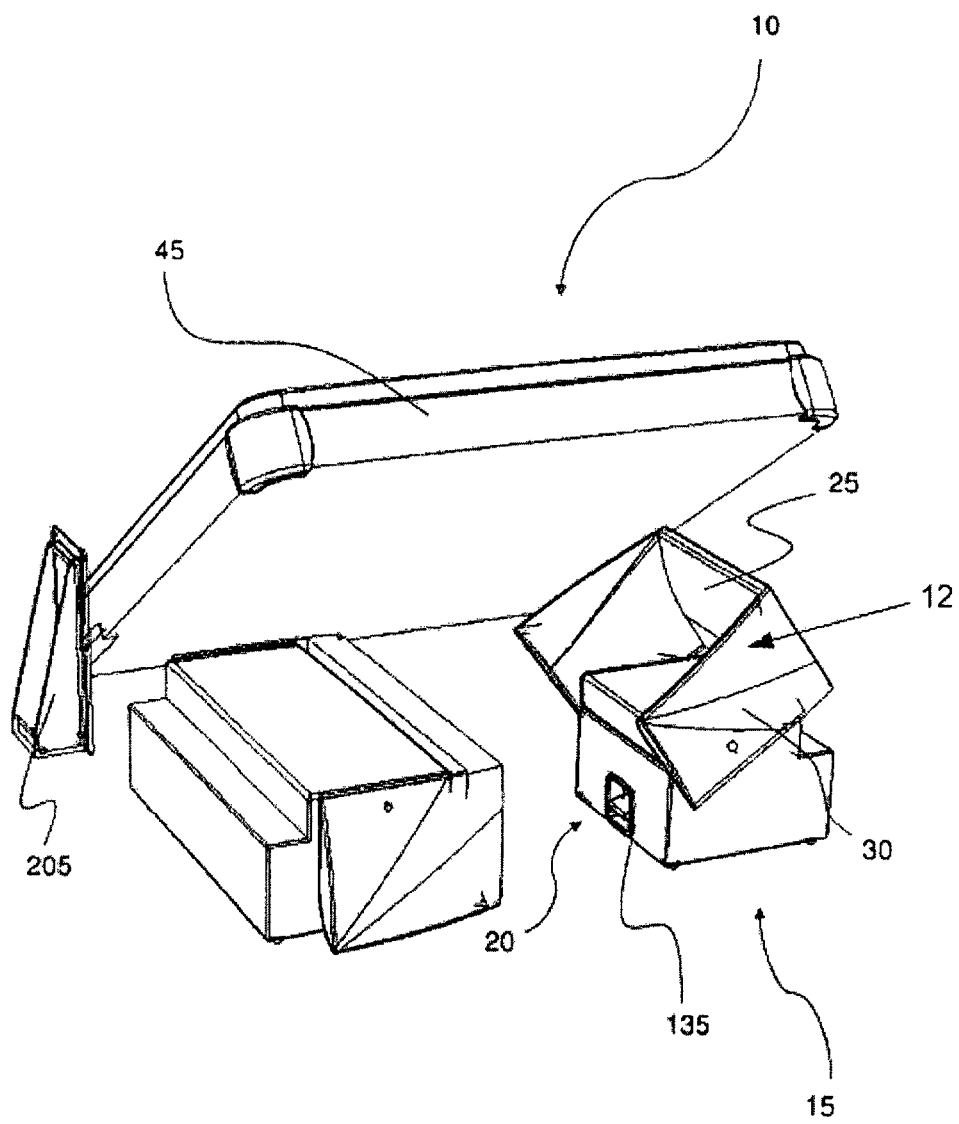
FIG. 7 is a perspective view of the fold-away bed arrangement of FIG. 6 in which one or more backrest portions of the respective one or more configurable seats are in a forwardly rotated orientation.
Figure 8:
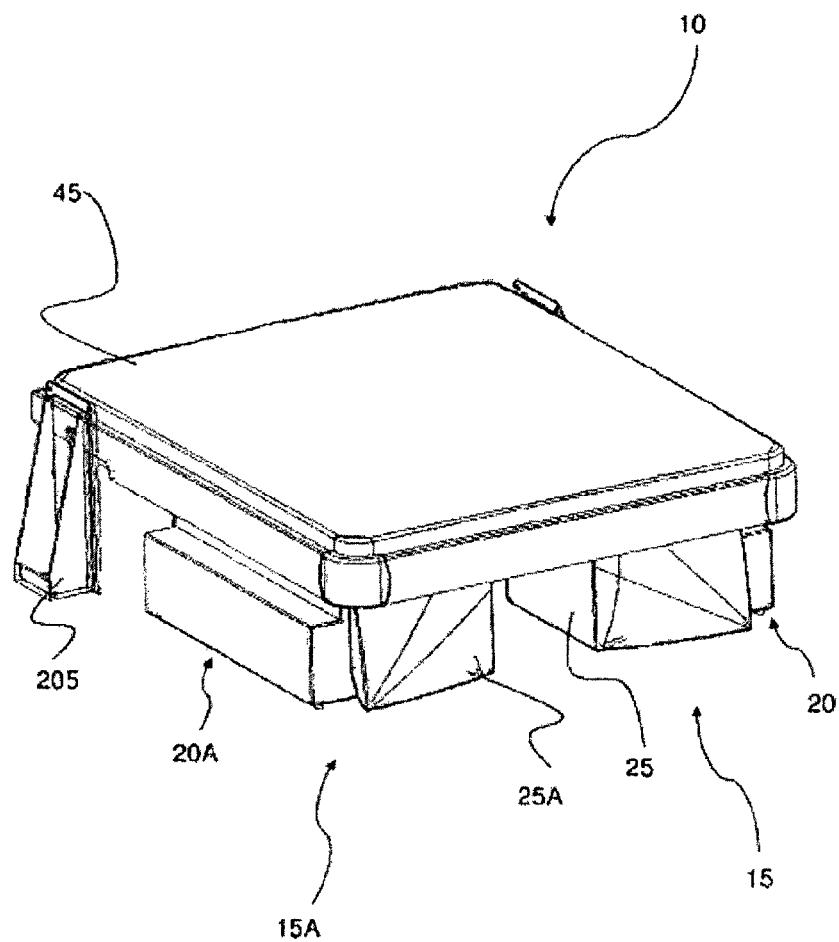
FIG. 8 is a perspective view of the fold-away bed arrangement of FIG. 6 in which the bed is in a substantially horizontal position and the one or more configurable seats are in a supporting mode.

Referring specifically to FIG. 6, the forward rotation of each backrest portion 25 about this pivot element 30 is such that the bottom surface of each backrest portion 25 in the seating mode after forward rotation becomes the top surface, as indicated by reference numeral 60, when each backrest portion 25 is in the supporting mode. In this embodiment, the top surface 60 of the backrest portion 25 is at a height which is at least level with or below that of the top surface 65 of the seat portion 12 of the one or more configurable seats 15. In this respect, when the bed 45 is moved into the substantially horizontal position, a bottom surface 70 of the bed 45 therefore engages with the top surface 65 of each seat portion 12, and the top surface 60 of the backrest portion 25, if the top surface 60 of the backrest portion 25 is at a height which is level with the top surface 65 of the seat portion 12, such that the bed 45 is at least supported by the one or more configurable seats 15.

In this embodiment, the backrest portion 25 of each of the one or more configurable seats 15 is adapted to further support the bed 45 in the supporting mode. Therefore, the bed arrangement 10 utilizes the one or more configurable seats 15 as supports for the bed 45, rather than having to incorporate or assemble, for example, support legs, for the bed 45, as might be applied in other embodiments.

In this embodiment, the supporting of the bed 45 on the one or more configurable seats 15 prevents further rotation of the backrest portion 25 by the pivot element 30. This prevents the backrest portion 25 from supporting the weight of the bed 45 alone, the bed 45 resting upon both the backrest portion 25 and the seat portion 12. Accordingly, the backrest portion 25 is adapted to withstand the stresses acting on the backrest portion 25 due to contact of the backrest portion 25 with a floor when in the supporting mode. Such adaptations may comprise, for example, a buffering strip on the surface of the backrest portion 25 which comes into contact with the floor when in the supporting mode.

In other embodiments, the rotation of the backrest portion 25 about the pivot element 30 between the seating mode and the supporting mode may be automated by way of, for example, an electric motor (not shown) that can be activated with a button, lever or remote control. Accordingly, the pivotal movement of the bed 45 between the substantially stowed upright position and the substantially horizontal position may also be automated by way of, for example, an electric motor with a button, lever or remote control. Such means of automation may be adapted such that both the backrest portion 25 and the bed 45 are automated for movement by, for example, one or more buttons, levers or a remote control.

In this embodiment, each of the one or more configurable seats 15 is adapted for reversible movement in a substantially horizontal plane between a seating position and a supporting position. The seating position is to be used when the bed 45 is in the substantially stowed upright position, for example, in which at least one of the one or more configurable seats 15 may be used for seating. The supporting position is such that at least each seat portion 12 of the one or more configurable seats 15 is positioned at least partially beneath the bed 45 to support the bed 45 when the bed 45 is in the substantially horizontal position, for example, in which the bed 45 may be slept in. Therefore, in this embodiment, the bed 45 is supported on only a part, whether insubstantial or substantial, of each seat portion 12 of the one or more configurable seats 15.

In this embodiment, the bed 45 is supported on the entirety of each seat portion 12 such that there is no encumbrance in the area surrounding the bed 45. It will be appreciated that each of the one or more configurable seats 15 may be of any dimension suitable for supporting the bed 45 when the bed 45 is in the substantially horizontal position. In this embodiment, each of the one or more configurable seats 15 has dimensions such that in the supporting mode, each of the one or more configurable seats 15 is positioned at least partially beneath the bed 45 such that there is no encumbrance in the area surrounding the bed 45, when the bed is in the substantially horizontal position.

In this embodiment, and as shown in FIG. 6, at least one of the one or more configurable seats 15 may be a sofa 15A, also known as a couch or settee, having a backrest portion 25A and at least one or more seat portions 20A. The sofa 15A may be configured for a seating mode, in which the at least one or more seat portions 20A and the backrest portion 25A are orientable for seating. The sofa 15A may also be configured for a supporting mode, in which the backrest portion 25A is forwardly rotatable by a pivot element 30A on the one or more seat portions 20A such that the orientation of the backrest portion 25A in the supporting mode is substantially inverted with respect to the orientation of the backrest portion 25A in the seating mode. Therefore, in this embodiment, in the supporting mode, a back surface 35A of the backrest portion 25A is located in front of each respective seat portion 12A. It will be appreciated that the sofa 15A is also adapted for reversible motion in the substantially horizontal plane between the seating position and the supporting position, as detailed above for the one or more configurable seats 15, where the seating position is to be used when the bed 45 is in the substantially stowed upright position, and the supporting position is to be used when the one or more seat portions 20A of the sofa 15A are positioned at least partially beneath the bed 45 to support the bed 45 when the bed 45 is in the substantially horizontal position.

In other embodiments, the sofa 15A may comprise two or more configurable seats, each of the two or more configurable seats being separable from one another and arranged for individual seating. Furthermore, the two or more configurable seats of the sofa 15A may be adapted for reversible motion in the substantially horizontal plane as individual configurable seats, or collectively as the sofa 15A. It will be appreciated that in this embodiment, the backrest portion of each of the two or more configurable seats is adapted for normal seating in a sofa 15A. For example, in a sofa 15A comprising two configurable seats, the backrest portions (not shown) of the two configurable seats comprise single armrest portions respective to the respective ends of the sofa. While in a sofa 15A comprising three configurable seats (not shown), the central backrest portion does not comprise armrest portions whilst the two other backrest portions may comprise single armrest portions respective to the respective ends of the sofa.

In this embodiment, the bed 45, which is, for example, a single bed, a double bed, a queen bed or a king bed, is configured for pivotal movement between the substantially stowed upright position and the substantially horizontal position when the one or more configurable seats 15 are in the supporting mode by action between the bed 45 and one or more fixed supports 205 fixedly mounted to one or more respective portions of the floor located, for example, on either side of the bed 45. In this embodiment, the one or more fixed supports 205 are attached to the bed 45 at one or more respective attachment points (not shown).

Pivotal movement of the bed 45 between the substantially stowed upright position and the substantially horizontal position is executable by way of a hydraulic mechanism using, for example, one or more hydraulic pistons, in which the one or more hydraulic pistons are attached at a first attachment point (not shown) to the bed 45 and at a second attachment point (not shown) to the one or more fixed supports 205. It will be appreciated that when the bed 45 is in the substantially horizontal position, the bed 45 is of a height above the ground in accordance with the normal range of heights associated with sleeping.

The transition of the bed 45 between the substantially horizontal position and the substantially stowed upright position may be manually executable, or may be automated by the use of, for example, a linear drive motor system.

In other embodiments, the one or more fixed supports 205 may comprise, for example, a supporting structure (not shown) designed to receive the bed 45; or hold the bed 45 upright and/or above the ground in its substantially upright stowed position. The action between the bed 45 and the one or more fixed supports 205 may utilize any one or more of the following types of mechanical load displacement mechanisms:

a coil spring mechanism, using, for example, one or more counterbalancing tension/extension or compression coil springs under axial load;
one or more torsional springs under torsional load; one or more gas struts;
a rack and pinion mechanism;
a single or multiple pulley system;
a system of wires; or any other mechanism which enables the bed 45 to orient between the substantially upright position and the substantially horizontal position.

For example, in other embodiments, the one or more fixed supports 205 may comprise a metal frame (not shown) located at least on the floor, attached to which, for example, through the use of one or more hooks, clips, catches or other attachment means (not shown), are one or more counterbalancing tension/extension coil springs (not shown). Further, the one or more springs may be attached at their opposite ends to a frame (not shown) supporting the bed 45, such that, in orienting the bed 45 between the substantially horizontal position and the substantially stowed upright position of the supporting mode and the seating mode, respectively, the springs extend and compress accordingly. Thus, the springs absorb and distribute the weight load of the bed 45 such that orienting between the supporting mode and the seating mode does not require a substantial amount of effort by a user.

Storage (not shown) of the bed 45, that is, forming a substantially stowed upright position, may utilize space available in, for example, a recess in a wall or a large piece of furniture such as a cabinet (not shown). The storage may be such that, when the bed 45 is in the substantially stowed upright position, the bed 45 is obscured from sight and does not intrude upon the surrounding area outside the vicinity of the storage space.

Alternatively, the bed 45 may be slidably mounted to the one or more fixed supports 205 such that, rather than pivotal movement as described in the preferred embodiment, the bed 45 may be raised in a substantially horizontal manner to a substantially raised position in which the bed 45 is elevated sufficiently from the floor to provide an area suitable, for example, for seating or dining, or lowered in a substantially horizontal manner to a substantially lowered position such that the bed 45 is in a substantially horizontal position suitable for sleeping. The height of the bed 45 above the ground in the substantially raised position is such that the bed 45 is not deemed to be an obstacle in accordance with normal use of the area in the seating mode. For example, in the seating mode, the bed 45 may rest against a ceiling (not shown), or be received in a recess (not shown) in the ceiling.

Alternatively, the bed 45 may be attached to the one or more fixed supports 205 such that, in the supporting mode, the bed 45 is in the substantially horizontal position supported by the one or more configurable seats 15. Whilst in the seating mode, the bed 45 is in a position which does not compromise the normal use of the area in the seating mode.

In other embodiments, the fold-away bed arrangement 10 may be adapted for use in a dining area, such that, for example, a dining table (not shown) may be used in the supporting mode to support the bed 45 when the bed 45 is in the substantially horizontal position. For example, the height of the dining table may be adjusted, telescopically or otherwise, to position the top surface of the dining table such that it engages with the bottom surface 70 of the bed 45 when the bed 45 is in the substantially horizontal position. In other embodiments, the fold-away bed arrangement 10 may be such that each backrest portion 25 of the one or more configurable seats 15 is pivotally mounted to the respective seat portion 12 by the pivot element 30 and forwardly rotated about the pivot element 30 such that, in the supporting mode, the backrest portion 25 is forwardly rotated. Therefore, a back surface 35 of the backrest portion 25 in the seating mode after forward rotation becomes the top surface 60 of the backrest portion 25 in the supporting mode. In this other embodiment, the top surface of the backrest portion 25 engages with the bottom surface 70 of the bed 45 to support the bed 45 when it is in the substantially horizontal position.

In a still further embodiment, the fold-away bed arrangement 10 may be such that at least the backrest portion 25 of the one or more configurable seats 15 is slidably mounted to each of the one or more configurable seats 15 such that the backrest portion 25 slides in a generally vertical direction between a substantially raised position and a substantially lowered position. Therefore, in the supporting mode, the backrest portion 25 is lowered to the substantially lowered position such that the top portion of the backrest portion 25 is at least level with the top of the seat portion 12 of the one or more configurable seats 15.

Therefore, in this further embodiment, the bottom surface 70 of the bed 45 rests upon the top surface 65 of the one or more seat portions 20 and also upon the top portion of each backrest portion 25 if it is exactly level in the substantially horizontal plane with the top surface 65 of each seat portion 12.

In a yet still further embodiment, in which the one or more configurable seats 15 comprise only the seat portion 12 and not the backrest portion 25, the fold-away bed arrangement 10 may comprise one or more beds 45 hingedly mounted to one or more respective walls (not shown) of, for example, a motor home or a caravan at a height which is generally level with the top surface 65 of the one or more seat portions 20. Therefore, in the seating mode, each of the one or more beds 45 may be in a substantially stowed upright position resting against the respective wall, or alternatively, resting in each of one or more recesses (not shown) in the respective wall for receiving each of the one or more beds 45 in the respective wall when in a substantially stowed upright position.

Accordingly, in the seating mode, an underside of each of the one or more beds 45 may be used; or be adapted to be used, as a backrest portion 25 for each of the one or more seat portions 20. Therefore, in this still further embodiment, each of the one or more seat portions 20 in the seating mode is proximally positioned to enable use of the underside of the respective bed 45 as a backrest portion 25. It will be appreciated that the one or more seat portions 20 may be in a fixed position relative to a floor of the motor home or caravan or adapted for reversible movement in a substantially horizontal plane as described in the preferred embodiment above, between a seating position, to be used when the respective bed 45 is in the substantially stowed upright position, and a supporting position, in which the respective bed 45 is in the substantially horizontal position.

Alternatively, the fold-away bed arrangement 10 may comprise one or more cushions (not shown) fixedly attached to the respective wall and located in proximity to one or more seat portions 20 such that each of the one or more cushions may be used as a backrest portion 25 for the respective seat portion 12 when in the seating mode. In this alternative embodiment, the one or more seat portions 20 may be adapted for reversible movement in a substantially horizontal plane between a seating position located adjacent the respective wall, to be used when the respective bed 45 is in the substantially stowed upright position, and a supporting position, in which the respective bed 45 is in the substantially horizontal position.

Alternatively, each of the one or more beds 45 may be slidably mounted to the respective walls such that each of the one or more beds 45, when in a substantially stowed upright position, is adapted to reversibly slide in a direction substantially parallel to the respective wall between a substantially raised position, in which each of the one or more beds 45 is able to forwardly rotate to a substantially horizontal position in accordance with the supporting mode, and a substantially lowered position, in which each of the one or more beds 45 is located between the respective wall and the one or more seat portions 20, and preferably at a height that enables a part of the underside of each of the one or more beds 45 may be adapted for use as a backrest portion.

In one example, the fold-away bed arrangement 10 may comprise one or more single beds (not shown), in which each of the one or more single beds is hingedly mounted about one of its longitudinal, or alternatively, its transverse sides, to a respective wall of, for example, the motor home or caravan, the respective walls being opposing walls of the motor home or caravan, such that in the supporting mode, the one or more single beds fold out about their hinged mountings on the opposing walls, and are each supported by one or more configurable seats 15, the one or more configurable seats 15 being located in either a fixed position relative to a floor of the motor home or caravan or adapted for reversible movement in a substantially horizontal plane as described in the preferred embodiment above, between a seating position, to be used when the respective bed 45 is in the substantially stowed upright position, and a supporting position, in which the respective bed 45 is in the substantially horizontal position. For example, in the instance in which the one or more single beds are two single beds, the two single beds may also fold out such that in the supporting mode, the two single beds are substantially adjacent to each other, such that the adjacent longitudinal sides of the two single beds are substantially in contact to form the appearance of, for example, a double bed. Accordingly, the one or more configurable seats may be positioned at least partially beneath the line of contact between the two single beds to support the single beds in the supporting mode.

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

LIST OF PARTS

1. Device
3. Rim
5. Surface engaging assembly
6. Coupling
7. Load bearing structure
8. Cushion arrangement
10. Fold away bed arrangement
11. Support portion
12. Seat portion
15. Scat
15A. Sofa
16. Biasing arrangement
17. Spring
20. Base portion
25. Back rest portion of configurable seat
26. Side rest
25A. Back rest portion of sofa
30. Pivot element of the configurable seat
30A. Pivot element of the sofa
35. Backrest surface
45. Bed
50. Linkage mechanism
65. Top surface
70. Bottom surface
85. Groove
90. Pin
91. Neck
95. Plate
100. Base arrangement
103. Removable plug
105. Circular bearing race
106. Pivot mechanism
110. Head portion
115. Castor wheels
120. Locking mechanism
135. Shaft portion
140. Leg support shaft
141. Support bracket
142. Cylindrical portion
143. Aperture
144. Top surface
145. Attachment point
150. Levelling arm
160. Side wall
170. Front wall
172. Back wall
174. Access aperture
174. Release arm
190. Pivot point
191. Pivot point
195. Cross member 200. Adjoining members
205. Fixed supports
210. Aperture
S. Surface

The invention claimed is:

1. A device for restricting movement of a weight load across a surface, said device comprising:
 a coupling to mechanically interconnect said device with a connector fixed relative to a surface; and
 a lock mechanism which is activated when said device is in an unloaded condition, to allow said device to be locked relative to said connector.

2. The device according to claim 1, wherein said lock mechanism, when engaged, inhibits said device from being lifted clear of said surface.

3. The device according to claim 2, wherein in said unloaded condition said lock mechanism automatically assumes an engaged condition in which said connector and said coupling lock with one another, and in a loaded condition said locking mechanism is in a disengaged condition in which said connector and said coupling are released to allow limited movement relative to one another.

4. The device according to claim 3, wherein said lock mechanism further comprising a biasing assembly which urges said lock mechanism toward said engaged condition.

5. The device according to claim 4, wherein said lock mechanism is provided by engaging parts of said coupling and said connector which are engaged with one another in said engaged condition.

6. The device according to claim 5, wherein said biasing assembly is arranged to urge said device away from said surface, and said engaging parts are dimensioned to provide an end to travel stop to oppose a lifting of said device away from said surface.

7. The device according to claim 6, wherein said engaging parts are provided in the form of a slot and a pin which is at least partially received by said slot, said pin having a head which is dimensioned to bear against said slot in said engaged condition thereby providing said end of travel stop.

8. The device according to claim 7, wherein in said disengaged condition, said pin is slidable within said slot, wherein said slot defines said limited lateral movement of said device relative to said surface.

9. The device according to claim 8, wherein said slot is defined in a base plate of said device, and said pin is fixed to said surface, and said base plate is pivotable so as to allow said device to rotate about an axis substantially perpendicular to said surface.

10. The device according to claim 4 further comprising a load bearing structure and a linkage mechanism housed within said load bearing structure, said linkage mechanism interconnecting a first location on said load bearing structure with a second location on said load bearing structure such that said weight load applied or removed at one of said first and second locations is evenly distributed to the other of said first and second locations thereby providing even movement of said load bearing structure between said loaded and unloaded conditions.

11. The device according to claim 10 further comprising a lever operably connected to said linkage mechanism to move said lock mechanism between said engaged and disengage conditions.

12. The device according to claim 10, wherein said load bearing structure further comprising opposition sides, wherein said first location is located on one of said opposing sides, and said second location is located on an other of said opposing sides.

13. The device according to claim 12, wherein said linkage mechanism further comprising a linkage arm coupled to each of said opposing sides and a cross member which interconnects each of said linkage arms.

14. The device according to claim 13, wherein said friction reducing arrangement comprising at least two wheels and said coupling is located intermediate said at least two wheels, wherein said biasing arrangement includes a spring, and wherein said surface is a floor surface of a vehicle.

15. The device according to claim 10, wherein said load bearing structure is supported by at least one friction reducing arrangement.

16. The device according to claim 15, wherein said biasing arrangement is configured to elevate said load bearing structure relative to said surface by urging said at least one friction reducing arrangement against said surface.

17. The device according to claim 1 further comprising a leveling mechanism which links a first location on said device with a second location on said device such that a weight load applied at one of said first and second locations is evenly distributed to the other of said first and second locations.

18. The device according to claim 1 further comprising a lever coupled to said lock mechanism to manually disengage said lock mechanism when said device is unloaded.

19. The device according to claim 1, wherein said device provides a base of a chair such that when said weight load is placed on said chair then said weight load moves said lock mechanism to said disengaged condition and when said weight load vacates said chair said lock mechanism moves to said engaged condition.

20. A method of operating a device for restricting movement of a weight load across a surface, said method comprising the steps of:
 a) applying said weight load to said device comprising a coupling and a lock mechanism, said coupling mechanically interconnects said device with a connector fixed relative to said surface;
 b) disengaging said lock mechanism when said weight load is applied to said device;
 c) moving said device from a first position to a second position;
 d) removing said weight load from said device;
 e) engaging said lock mechanism when said weight load is removed from said device; and
 f) locking said device relative to said connector.

* * * * *